United States Patent [19]

Ferron

[11] Patent Number: 5,602,994
[45] Date of Patent: Feb. 11, 1997

[54] METHOD AND APPARATUS FOR HIGH SPEED DATA ACQUISITION AND PROCESSING

[75] Inventor: John R. Ferron, San Diego, Calif.

[73] Assignee: The United States of America as represented by the United States Department of Energy, Washington, D.C.

[21] Appl. No.: 950,548

[22] Filed: Sep. 25, 1992

[51] Int. Cl.$^6$ .................................................. G06F 13/00
[52] U.S. Cl. ................... 395/250; 364/939.4; 364/239.1
[58] Field of Search .................................. 395/200, 250, 395/275, 325; 370/63

[56] References Cited

U.S. PATENT DOCUMENTS

| | | | |
|---|---|---|---|
| 3,582,901 | 6/1971 | Cochrane et al. | 340/172.5 |
| 3,656,116 | 4/1972 | Jansen | 340/172.5 |
| 3,744,028 | 7/1973 | Kirk | 340/172.5 |
| 3,755,785 | 8/1973 | Kirk | 395/275 |
| 4,016,548 | 4/1977 | Lar | 370/77 |
| 4,124,889 | 11/1978 | Kaufman | 395/275 |
| 4,137,562 | 1/1979 | Boeck et al. | 364/200 |
| 4,319,325 | 3/1982 | Hoff et al. | 364/200 |
| 4,447,873 | 5/1984 | Price et al. | 364/200 |
| 4,480,317 | 10/1984 | Haag et al. | 364/900 |
| 4,573,141 | 2/1986 | Simon | 364/900 |
| 4,574,351 | 3/1986 | Dang | 395/250 |
| 4,583,163 | 4/1986 | Kobayashi | 395/375 |
| 4,592,012 | 5/1986 | Braun | 364/900 |
| 4,608,554 | 8/1986 | Blair | 340/347 |
| 4,675,803 | 6/1987 | Kendall | 364/131 |
| 4,740,909 | 4/1988 | Conklin et al. | 364/900 |
| 4,799,144 | 1/1989 | Parruck et al. | 364/200 |
| 4,807,183 | 2/1989 | Kung et al. | 364/900 |
| 4,864,572 | 9/1989 | Rechen et al. | 371/2.1 |
| 5,323,399 | 6/1994 | Kurano | 370/112 |
| 5,327,422 | 7/1994 | Abefelt | 370/63 |

OTHER PUBLICATIONS

An Advanced Plasma Control System for the DIII–D Tokamak, J. R. Ferron, et al., 14th IEEE/NPS Symposium on Fusion Engineering, Sep. 30, 1991–Oct. 3, 1991, San Diego, CA.

Real Time Analysis of Tokamaak Discharge Parameters, J. R. Ferron, et al., 9th Topical Conference on High–Temperature Plasma Diagnostics, Mar. 16–20, 1992, Santa Fe, New Mexico.

*Primary Examiner*—David Y. Eng
*Attorney, Agent, or Firm*—Miguel A. Valdes; William C. Daubenspeck; William R. Moser

[57] ABSTRACT

A method and apparatus for high speed digital data acquisition. The apparatus includes one or more multiplexers for receiving multiple channels of digital data at a low data rate and asserting a multiplexed data stream at a high data rate, and one or more FIFO memories for receiving data from the multiplexers and asserting the data to a real time processor. Preferably, the invention includes two multiplexers, two FIFO memories, and a 64-bit bus connecting the FIFO memories with the processor. Each multiplexer receives four channels of 14-bit digital data at a rate of up to 5 MHz per channel, and outputs a data stream to one of the FIFO memories at a rate of 20 MHz. The FIFO memories assert output data in parallel to the 64-bit bus, thus transferring 14-bit data values to the processor at a combined rate of 40 MHz. The real time processor is preferably a floating-point processor which processes 32-bit floating-point words. A set of mask bits is prestored in each 32-bit storage location of the processor memory into which a 14-bit data value is to be written. After data transfer from the FIFO memories, mask bits are concatenated with each stored 14-bit data value to define a valid 32-bit floating-point word. Preferably, a user can select any of several modes for starting and stopping direct memory transfers of data from the FIFO memories to memory within the real time processor, by setting the content of a control and status register.

22 Claims, 14 Drawing Sheets

FIG. 7

| DIGITIZER ID: | 2812 | 2812 | 2812 | 2812 | 2812 | 2812 | 2812 | 2812 | 2812 | 2812 | 2812 | 2812 | 2812 | 2812 | 2812 | 2812 |
|---|---|---|---|---|---|---|---|---|---|---|---|---|---|---|---|---|
| | 1 | 0 | 1 | 0 | 1 | 0 | 1 | 0 | 1 | 0 | 1 | 0 | 1 | 0 | 1 | 0 |
| CHANNEL NUMBER | 9,10,11,12,13,14,15,16 | 1,2,3,4,5,6,7,8 | 9,10,11,12,13,14,15,16 | 1,2,3,4,5,6,7,8 | 9,10,11,12,13,14,15,16 | 1,2,3,4,5,6,7,8 | 9,10,11,12,13,14,15,16 | 1,2,3,4,5,6,7,8 | 9,10,11,12,13,14,15,16 | 1,2,3,4,5,6,7,8 | 9,10,11,12,13,14,15,16 | 1,2,3,4,5,6,7,8 | 9,10,11,12,13,14,15,16 | 1,2,3,4,5,6,7,8 | 9,10,11,12,13,14,15,16 | 1,2,3,4,5,6,7,8 |
| CRATE SLOT # | 1 | 2 | 3 | 4 | 5 | 6 | 7 | 8 | 9 | 10 | 11 | 12 | 13 | 14 | 15 | 16 |
| DIGITIZER LABEL: | 1A | 1A | 1B | 1B | 1C | 1C | 1D | 1D | 2A | 2A | 2B | 2B | 2C | 2C | 2D | 2D |

Slots 1–8: GROUP 1 DIGITIZERS
Slots 9–16: GROUP 2 DIGITIZERS

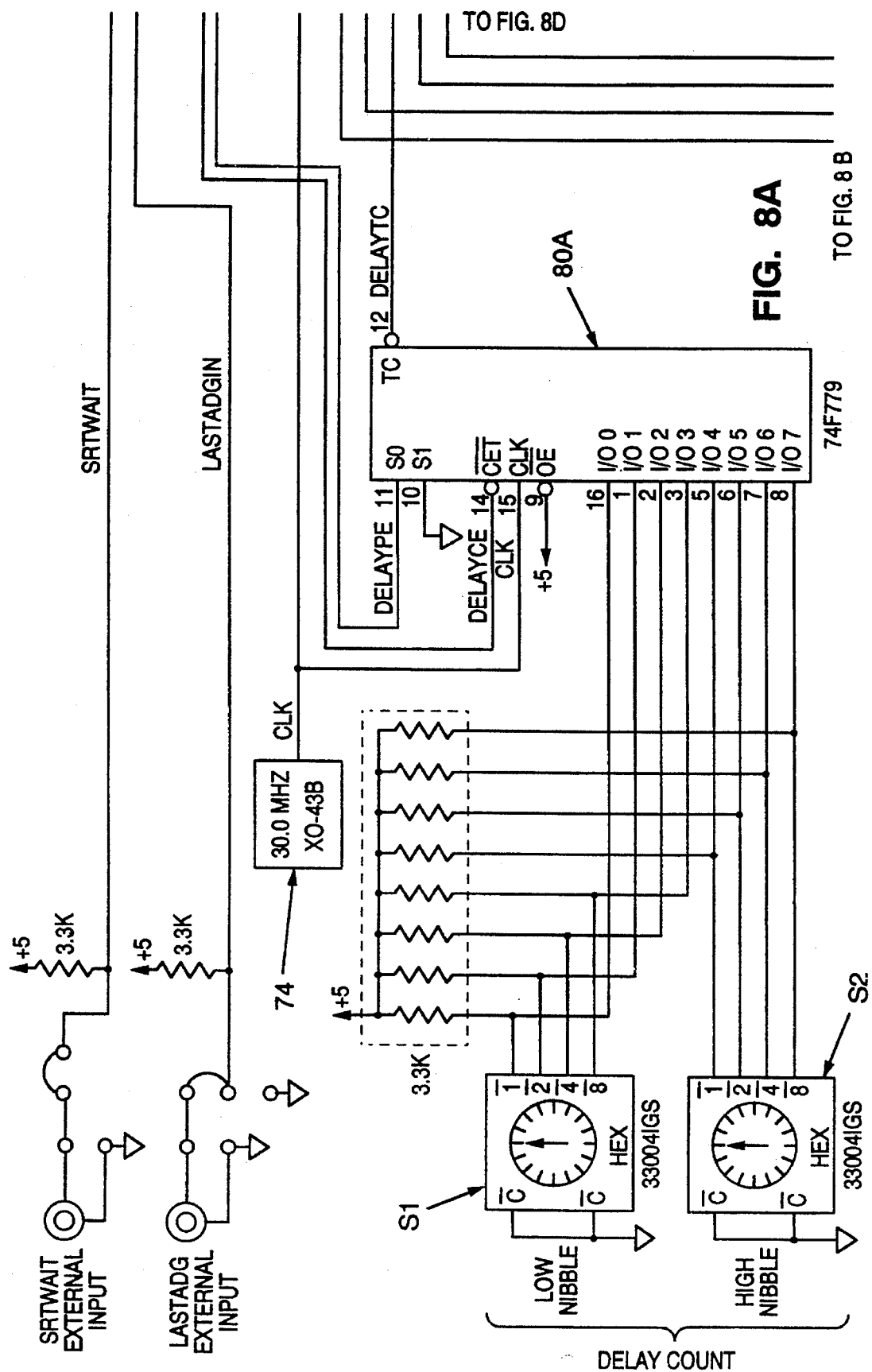

_5,602,994_

METHOD AND APPARATUS FOR HIGH SPEED DATA ACQUISITION AND PROCESSING

The United States Government has rights in this invention pursuant to Contract No. DE-AC03-89ER51114 between the United States Department of Energy and General Atomics.

FIELD OF THE INVENTION

The invention pertains to a method and apparatus for high speed acquisition of digital data. More particularly, the invention pertains to a method and apparatus for high speed acquisition of multiple channels of digital data, and high speed transfer of the data to one or more processors for high speed processing therein.

BACKGROUND OF THE INVENTION

Digital data processing systems are employed in many applications, including a variety of laboratory process control, real time data analysis, and real time data reduction operations. In many process control applications, it would be desirable to perform process control with fast time response (for example, where a large vector of input data is received during each control cycle, or where a matrix multiplication is required during each control cycle). It would also be desirable in many applications to perform high speed real time analysis or reduction on large amounts of data.

High speed real time data reduction is often desirable in connection with long pulse or steady state experiments in which the amount of data generated far exceeds the capacity to store data for later analysis. In such cases, real time data reduction results in extraction of a limited set of parameters for storage. It is often desirable to perform high speed real time analysis to search for signatures of interesting events which indicate time intervals during which data should be stored or processed.

Microprocessors having very high processing speed are commercially available. For example, the 64-bit Intel 80860 microprocessor (commercially available from Intel Corporation, and sometimes referred to herein as an "i860" processor) can perform as many as 80 million floating point operations per second simultaneously with 40 million integer (scalar unit) operations per second. It is likely that the processing speed of commercially available microprocessors will increase in the future.

However, high speed real time data analysis (and other high speed digital data processing) requires not only means for high speed data processing, but also means for high speed acquisition of the data to be processed. High speed data acquisition is particularly important when a large number of sensors must be sampled during each analysis cycle.

Until the present invention, it had not been known how to implement high speed data acquisition, for example with acquisition rates of 40 million data values (such as fourteen-bit data words) per second. Nor had it been known how to implement high speed acquisition of integer-format data, high speed conversion of the integer-format data to floating-point format, and high speed transfer of such floating-point format data to a floating-point processor (for example, transfer of 40 million fourteen-bit integer-format words per second to a floating-point processor to enable real time, floating-point processing of 40 million 32-bit floating-point format data words per second).

Nor had it been known how to implement high speed data acquisition in any selected combination of several user-selectable data transfer start and stop modes.

SUMMARY OF THE INVENTION

The invention is a method and apparatus for high speed acquisition of digital data. In a class of embodiments, the apparatus of the invention includes one or more multiplexers (each for receiving multiple channels of digital data at a low data rate and asserting a multiplexed output data stream at a high data rate), and a first-in-first-out (FIFO) memory means for receiving digital data at the high rate from each multiplexer and asserting this data to a real time processor (or to a memory associated with the real time processor).

In preferred embodiments, the invention includes (for each real time processor) a pair of multiplexers, a pair of FIFO memories, and a 64-bit bus connecting the FIFO memories to the real time processor (or to a memory associated with the real time processor). Each multiplexer receives four channels of 14-bit digital input data at a data rate (5 MHz per channel in a preferred embodiment), and outputs the received data as a single 14-bit data stream (having a data rate of 20 MHz) to the FIFO memory connected thereto. The two FIFO memories assert 14-bit data streams (in parallel) to the 64-bit bus, at a combined data rate of 40 million 14-bit data values per second. Thus, the inventive apparatus effectively transfers 14-bit data values to the real time processor at a data rate of 40 MHz.

In a preferred embodiment, the inventive apparatus transfers data to a real time, floating-point processor capable of processing 32-bit data words having floating-point format. Mask bits are prestored in each 32-bit storage location of a memory within the processor, and a 14-bit data value (having integer format) is later written from the FIFO memories to each such storage location of the processor memory. As a result of this process, in each storage location of the processor memory, an identical set of mask bits is thus concatenated with a 14-bit data value to define a 32-bit word. The set of mask bits is preferably chosen so that each stored 32-bit concatenation of mask and data bits defines a valid 32-bit floating-point word (such as an IEEE format 32-bit floating-point word). This embodiment of the invention thus receives eight channels of 14-bit data values in integer format (at a rate of 5 MHz per channel) and effectively stores, in the memory of the real time processor, two parallel streams of 32-bit floating-point words (at a net rate of 40 million 32-bit floating-point words per second). The input rate of 5 MHz per channel (in a class of preferred embodiment) is determined by the desire to ensure integrity of the input signals and by the speed of the multiplexers (which are preferably commercially available integrated circuits) used with the FIFO memory means.

In a preferred embodiment, the apparatus of the invention includes at least one control and status register. By setting the content of such a register, a user can select any of several modes for starting and stopping direct memory transfers of data from the FIFO memories to a memory within the real time processor. For example, any of the following memory transfer start modes can be selected: start in response to a first value of a start trigger signal; start automatically when half of the available FIFO memory is filled; or start in response to a request from the real time processor. Also, any of the following memory transfer stop modes can be selected (independently from selection of a start mode): stop when a FIFO memory is empty provided that the start trigger signal has a second value; stop automatically when a specified number of data values have been transferred from the FIFO memory; or stop when a FIFO memory is empty.

BRIEF DESCRIPTION OF THE DRAWINGS

FIG. 7 is a diagram illustrating the sequence in which digital data words from digitizers 11 of FIG. 5 are written to real time computer memory 16a.

FIG. 8A–8F are detailed schematic diagram of respective dashed sections labeled in the overview FIG. 8 MAP.

DETAILED DESCRIPTION OF THE PREFERRED EMBODIMENT

Figure 1:
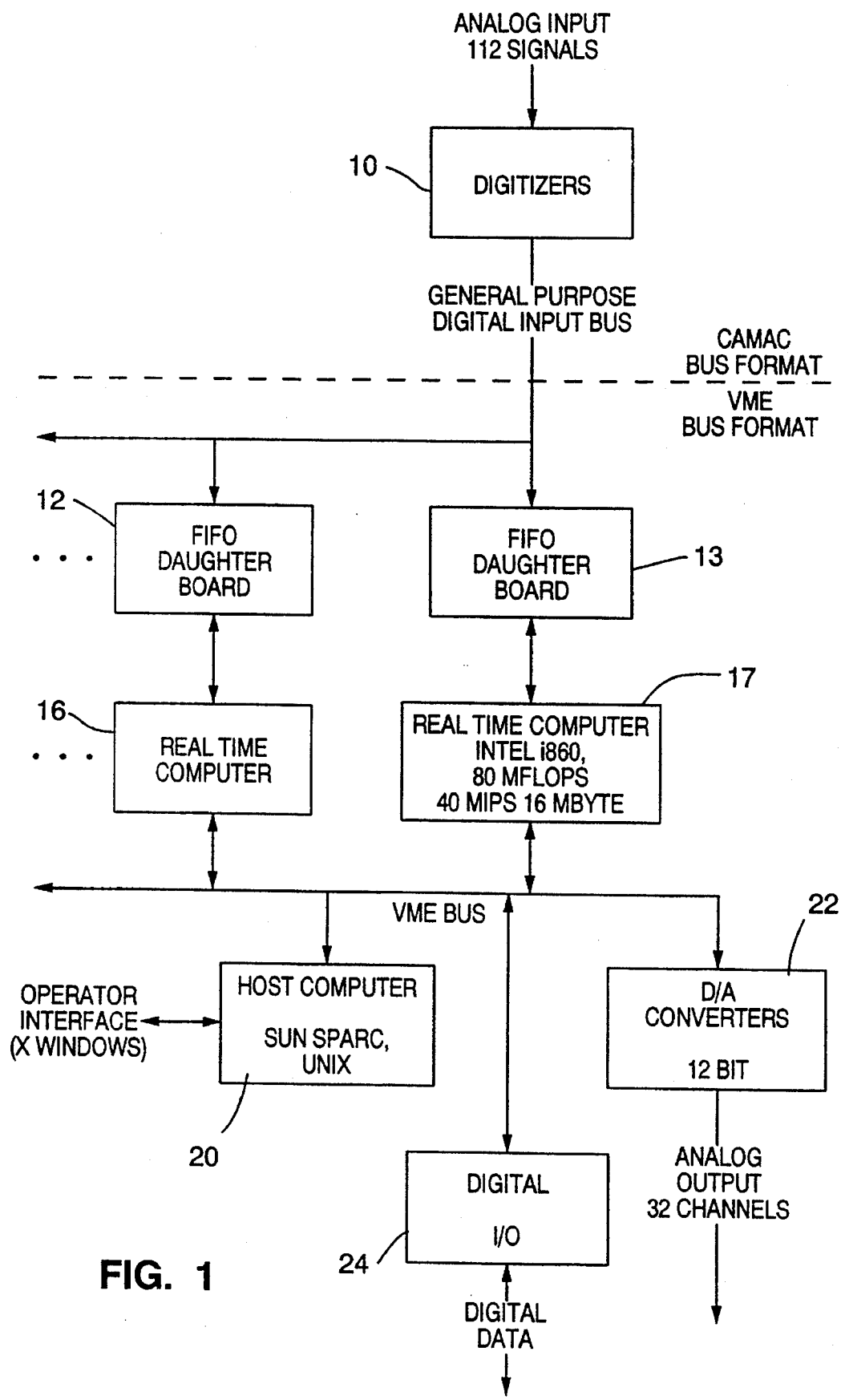
FIG. 1 is a block diagram of an embodiment of the inventive apparatus for high speed acquisition of digital data, and high speed transfer of the data to a set of real time processors.

A preferred embodiment of the invention will be described with reference to FIG. 1. In this embodiment, the invention includes analog-to-digital conversion circuitry 10 which receives a number of analog input signals (for example, 112 analog signals) and asserts a digitized version of each analog input signal onto a general purpose digital input bus for transfer to a set of identical FIFO daughter boards (including FIFO daughter boards 12 and 13). Digitizer circuitry 10 can include one or more conventional CAMAC format digitizers (as indicated in FIG. 1) such as Model 2812 CAMAC format TRAQ digitizers available from DSP Technology Inc., or it can comprise other conventional digitizing means such as a CCD camera or an array of CCD cameras.

Each of FIFO daughter boards 12 and 13 is connected to one of identical real time computers 16 and 17. Similarly, each of the other FIFO daughter boards (not shown) is connected to an additional real time computer (not shown). Preferably, each of the real time computers includes a 64-bit microprocessor (such as the i860 microprocessor commercially available from Intel Corporation), a memory (preferably having a capacity of at least 16 Mbytes), a VME format interface, and a general purpose interface to one of the FIFO daughter boards. For example, each real time computer can be a VME format SuperCard-2 computer, commercially available from CSP Inc.

Host computer 20 is connected to the real time computers (including computers 16 and 17) along a VME bus. Host computer 20, which can be a Sun Microsystems SPARCengine 1E VME board, facilitates software development, and provides a user interface (preferably through X window terminals). Software for i860 processors within real time computers 16 and 17 can be written in the assembly, C, or Fortran language.

For receiving processed digital data from the real time computers, digital-to-analog conversion circuitry 22 and digital input-output circuitry 24 can be connected along the VME bus. In a preferred embodiment, circuit 22 receives thirty-two channels of 12-bit digital data from the real time computers, and outputs thirty-two channels of analog data.

Figure 2:
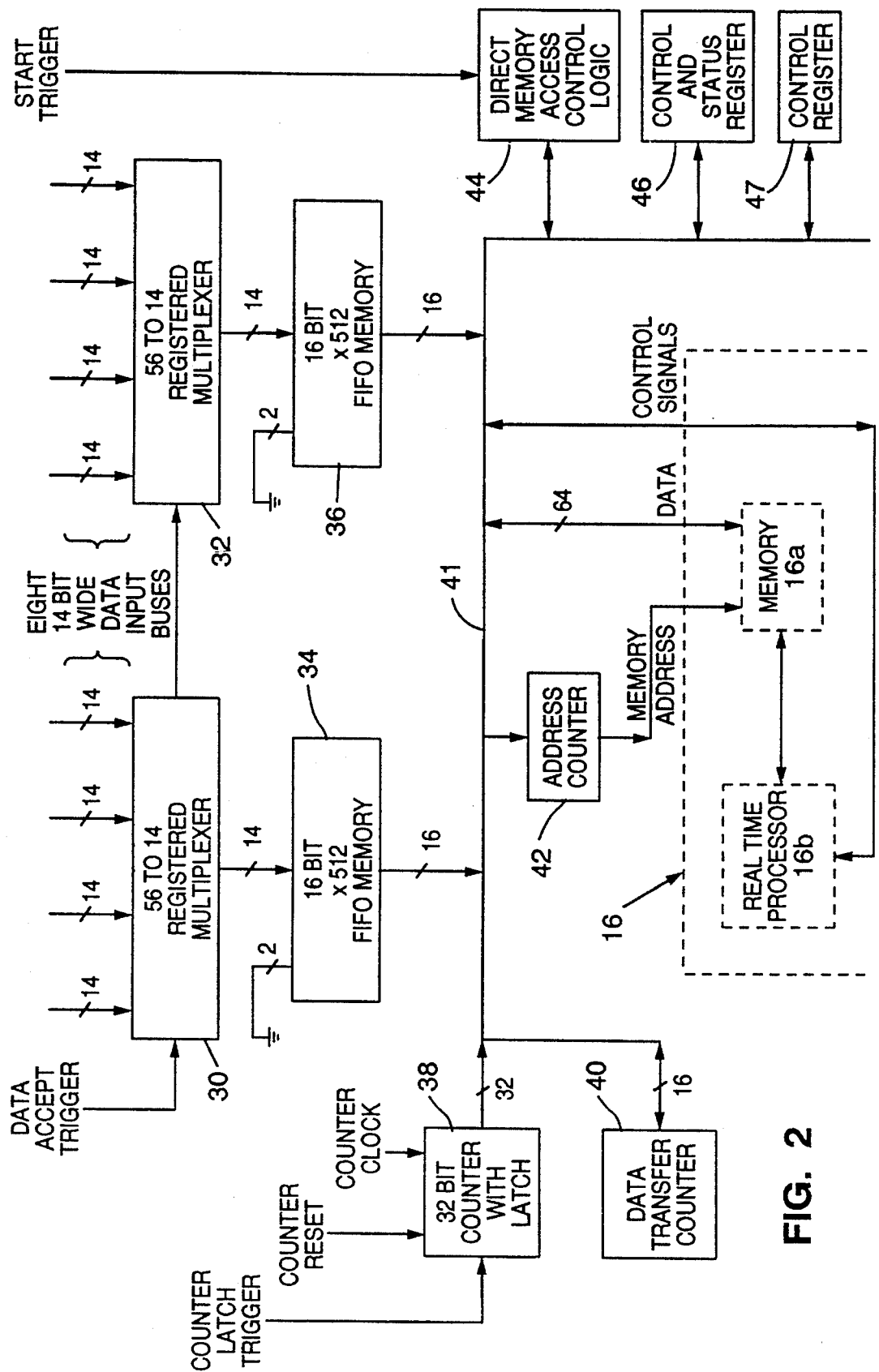
FIG. 2 is a block diagram of a preferred embodiment of one of the FIFO daughter circuits of FIG. 1.

A preferred embodiment of FIFO daughter board 12 will next be described with reference to FIGS. 2, 3, 5, and 6. In this embodiment, FIFO daughter board 12 operates under control of digitizer control circuit 15 (shown in FIG. 5), and includes identical multiplexers 30 and 32, identical FIFO memories 34 and 36, 32-bit counter 38, data transfer counter 40, address counter 42, direct memory access control logic 44, control and status register 46, control register 47, and 64-bit bus 41 which connects elements 34, 36, 38, 40, 42, 44, 46, and 47 to real time computer 16. Each of FIFO memories 34 and 36 can be a 16-bit wide by 512-bit deep synchronous FIFO memory with its two most significant bits tied to ground, as shown in FIG. 2, or an 18-bit wide synchronous FIFO memory (such as the "IDT72215L-20G" integrated circuit available from Integrated Device Technology) with its 2 most significant bits unused. Synchronous (rather than asynchronous) FIFO memory circuits are preferably employed for memories 34 and 36, because in the FIG. 2 apparatus, all functions are preferably synchronous with a clock signal.

Multiplexer 30 receives four channels of 14-bit digital input data (from digitizers 10) at a data rate of N words per second, and outputs the received data as a single 14-bit data stream (having a data rate of 4N words per second) to FIFO memory 34, and multiplexer 32 receives four channels of 14-bit digital input data (from digitizers 10) at a data rate of N words per second, and outputs the received data as a single 14-bit data stream (having a data rate of 4N words per second) to FIFO memory 36. FIFO memories 34 and 36 assert 16-bit data streams (in parallel, at a combined data rate of 8N words per second) to 64-bit bus 41, with the two most significant bits of each 16-bit value fixed at a constant value (i.e., they are tied low, so as to equal zero) and the fourteen least significant bits representing delayed versions of the 14-bit data values received from multiplexers 30 and 32. Each of FIFO memories 34 and 36 preferably has 16 bit×512 bit capacity, and functions as a buffer between the digital data source and the memory of real time computer 16, so that there is no requirement for synchronization of timing between the digital data source and the real time computer.

In a preferred embodiment in which the data rate N is equal to 5 MHz, FIFO memories 34 and 36 assert data onto the 64-bit bus at a combined data rate of 40 MHz (i.e., 4 million 14-bit input data values per second). In this embodiment, the apparatus of FIG. 2 effectively transfers 14-bit data values from digitizers 10 to real time processor 16 at a data rate of 40 MHz.

The data values from FIFO memories 34 and 36 are written into sequential memory locations in memory 16a within real time computer 16, so that the input channel associated with each data value can be easily identified. Real time processor 16b within computer 16 processes the data stored in memory 16a. In preferred embodiments in which processor 16b is an Intel 80860 processor, processor 16b is connected by a 64-bit bus to memory 16a, and operates with a 50 ns cycle time to achieve peak data transfer rates of 160 Mbytes per second between processor 16b and memory 16a.

A data bus buffer (not shown) will typically be connected between bus 41 and memory 16a, to provide a temporary storage location for data as they are transferred to memory 16a. Eight registered transceivers, such as the P29PCT52B transceivers available from Performance Technology, can be employed to implement such a data bus buffer.

Processor 16b typically cannot access memory 16a while data transfer from FIFO memories 34 and 36 is in progress, so the amount of time available for memory access during processing of data by processor 16b depends on the average rate of data transfer from FIFO memories 34 and 36 to memory 16a.

The use of multiplexed input to each of FIFO memories 34 and 36 reduces the required speed of each data source and the frequencies of signals on each data input cable while still providing for high speed data transfer (preferably at a rate equal to the maximum speed of the memory within the real time computer) to the real time computer. To provide eight input channels, eight separate data sources (e.g., sensors) can be wired in parallel, or data from a single source can be accumulated in a register having a width of eight samples before eight channels of the data are transferred to multiplexers 30 and 32. The transfer speed of the FIG. 2 apparatus will decrease linearly with decreased number of active input channels, and the apparatus can be programmed to ignore each input channel which is not currently in use.

Use of FIFO memories 34 and 36 eliminates the need for synchronization between the data source clock and the clock of real time processor 16b. This allows the FIG. 2 apparatus to implement parallel processing in which multiple input signals are daisy-chained to several FIFO daughter boards. Although data can be written to the FIFO daughter boards simultaneously (or substantially simultaneously), an actual DMA (direct memory access) transfer from any of the FIFO daughter boards to any of the real time processor memories can be performed independently of any other DMA transfer from another of the FIFO daughter boards.

Direct memory access control logic means 44 contains the logic required to perform the two main functions of the FIG. 2 apparatus: respond to requests to read from or write to elements 38, 40, 42, 46, and 47; and perform burst writes of data into memory 16a (direct memory access or "DMA" operations).

The FIG. 2 apparatus includes control and status register 46 (preferably a 32-bit read/write register which controls the functioning of the FIG. 2 system and indicates system status) and control register 47 (preferably a 24-bit read/write register which controls the functioning of the FIG. 2 system). By setting the content of registers 46 and 47 (such as by programming them in response to commands entered to host computer 20), a user can select any of several modes for starting and stopping DMA transfers of data from FIFO memories 34 and 36 to memory 16a within real time computer 16. For example, any of the following modes for starting such memory transfers can be selected:

1. a transfer will start when direct memory access control logic 44 receives a start trigger signal having a first value (i.e., the value "1");
2. a transfer will start automatically when half of the available memory within FIFO memory 34 or 36 is filled; or
3. a transfer will start in response to a request asserted on bus 41 by real time computer 16.

Also, any of the following modes for stopping such memory transfers can be selected (independently from selection of a start mode):

1. a transfer will stop when FIFO memory 34 and 36 are empty, provided that direct memory access control logic 44 receives a start trigger signal having a second value (i.e., the logic value "0");
2. a transfer will stop when FIFO memory 34 and 36 are empty, regardless of the status of the start control signal asserted to direct memory access control logic 44; or
3. a transfer will stop automatically when a specified number of data values have been transferred from FIFO memories 34 and 36.

Start mode 1 and stop mode 1 are particularly useful when the data acquisition is completely under the control of the external data source. In this case, the external data source asserts the sample trigger signal (shown in FIG. 5) to request a DMA transfer immediately before commencing to transfer data to multiplexers 30 and 32 of FIFO daughter board 12, and digitizer controller 15 asserts a start trigger signal having logic value "1" in response to the sample trigger signal. Data are then transferred continuously from the source, through FIFO board 12, to memory 16a of computer 16. FIFO memories 34 and 36 may become temporarily empty if the external source does not provide data sufficiently quickly. If this occurs, control logic 44 causes the FIG. 2 apparatus to pause until data are again available (for transfer to computer 16) in FIFO memories 34 and 36. In this mode, there is minimal delay in the transfer of data from the external source to memory 16a, which is particularly desirable for real time control applications. When the external source has finished providing data, the start trigger signal is given its second value (i.e., the logic value "0"). However, the DMA transfer does not end until FIFO memories 34 and 36 become empty so that all available data are written to processor memory 16a.

Start mode 2 and stop mode 3 are designed to be used together, when the external source provides a continuous stream of data at an arbitrary rate and processor 16b will process the data in batches (such as in applications in which a delay between sampling of the data and processing of the data can be tolerated, such as real time data reduction or storage of input data where control feedback to an experiment is unnecessary). When both start mode 2 and stop mode 3 have been selected, processor 16b controls data transfer from the external data source by requesting a specific number of data values per DMA transfer to computer 16. The external source controls the transfer of data into FIFO memories 34 and 36. When FIFO memories 34 and 36 are half full, a DMA transfer is automatically triggered, and the transfer ends when the required number of values has been written to memory 16a. Processor 16b then processes this batch of data in memory 16a while the next batch is written into FIFO memories 34 and 36. The number of data values per batch is determined by a value written into data transfer counter 40 (of FIG. 2) by processor 16b.

The ability of the FIG. 2 apparatus to read data transfer counter 40 to determine the number of data values per DMA transfer enhances the flexibility with which the FIG. 2 apparatus can be programmed to execute a desired data acquisition protocol. Data transfer activity is enabled or disabled by assertion (onto bus 41) of control bits from register 46 or 47. Control bits stored in registers 46 and 47 can also be employed to clear the content of FIFO memories 34 and 36, provide trigger and enable signals to the external data source, and reset both the FIG. 2 apparatus and the external data source.

The location of the first memory buffer within computer 16 to receive data values from the FIFO memories during each direct memory access (DMA) cycle is determined by the value asserted at the output of address counter 42 at the start of the DMA cycle. Address counter 42 operates in a manner which depends on the operating mode of the FIG. 2 apparatus. For example, an address can be loaded into address counter 42 from an address register (not shown) at the start of each DMA cycle. In this mode, the same block of memory 16a receives input data from FIFO memories 34 and 36 during each DMA cycle unless the value in the address register is changed. In an alternative mode, an address value is loaded into address counter 42 at the start of one DMA cycle, and address counter will automatically increment after each DMA cycle. In this mode, consecutive DMA operations will fill consecutive blocks in memory 16a because address counter 42 will always automatically increment to point to the next location in memory 16a to receive data, and address counter 42 will not be altered between DMA cycles.

In both modes mentioned in the previous paragraph, only 32 bits of the 64-bit bus 41 are normally used during each DMA (write) cycle, and the locations of memory 16a corresponding to the other 32-bits are not written with data during each DMA cycle. To maximize utilization of memory locations within memory 16a, in an optional "continuous memory" mode (initiated by setting an appropriate bit within register 46 or 47), address counter 42 increments only after every other write operation (so that it points to the same group of eight bytes within memory 16a for two consecutive writes). On alternating write operations, alternating halves of 64-bit bus 41 are used (so that for example, data are written to bytes 0, 1, 4, and 5 of memory 16a during one write, and data are written to bytes 2, 3, 6, and 7 of memory 16a during the next write). In this manner, data are written to every location of memory 16a.

To learn when a DMA transfer has finished, processor 16b can either poll a bit in the control and status register 46, or processor 16b can request that an interrupt be generated at the end of each DMA cycle.

Counter 38 is a 32-bit counter (having a latch for recording the counter value) which provides timing information. Counter 38 is cleared by a "Counter Reset" signal received from digitizer controller 15 (to be described with reference to FIGS. 5, 6, and 8 below), and is incremented by a "Counter Clock" signal received from digitizer controller 15 to record sampling time, or count a set of events, in a data gathering experiment. The value of counter 38 can be latched at the time indicated by a "Counter Latch Trigger" signal received from digitizer controller 15, and then read by processor 16b or written into memory 16a during a data transfer (in order to record the time of some significant event, such as the trigger time of a set of data samples). Processor 16b can also read the current value of counter 38 at any time.

In a preferred embodiment, real time processor 16b is capable of performing floating-point operations on 32-bit data words having floating-point format. In this embodiment, before data are transferred from FIFO memories 34 and 36 to computer 16, processor 16b causes mask bits to be stored in part of each 32-bit storage location (floating point register) of processor memory 16a in which a 16-bit data value (having integer format) from FIFO memory 34 (or 36) is to be written. Then, after a data transfer in which a 16-bit data value is written from FIFO memory 34 or 36 into each of several different 32-bit storage locations of memory 16a, an identical set of mask bits will be concatenated (within each such 32-bit storage location) with a stored 16-bit data value (of which fourteen bits represent an input data value from multiplexer 30 or 32). In this mode of operation, only two 16-bit words are written (in parallel) to memory 16a during each write operation. Thus, data are transferred from FIFO memories 34 and 36 to computer 16 at only half the maximum rate which bus 41 is capable of supporting (at such maximum rate, 64 parallel bits transferred over bus 41 per write operation). However, the mode minimizes the total time required to transfer data to memory 16a and also convert the transferred data to floating-point format, since it enables conversion (into floating-point format) of each 16-bit integer that has been transferred from FIFO memory (34 or 36) into memory 16a in a single clock cycle of computer 16.

Figure 4A:
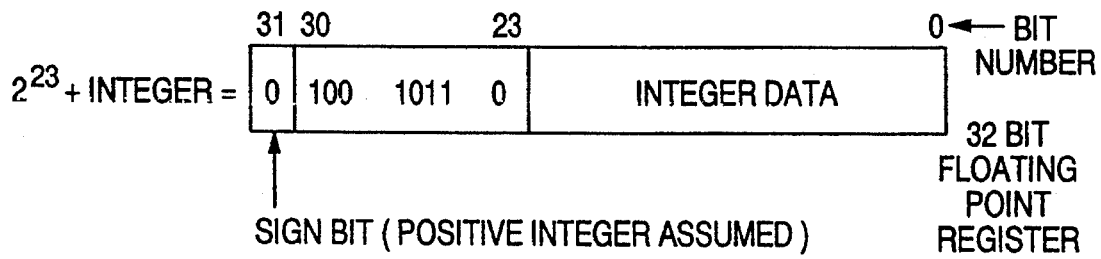
FIG. 4(a) is a diagram representing a 32-bit data word in floating point format.

The latter is true because, if the mask bits are appropriately selected, each set of thirty-two concatenated mask and data bits defines a valid 32-bit floating-point word, such as that shown in FIG. 4(a). FIG. 4(a) represents a thirty-two bit storage location (floating point register) of processor memory 16a. As indicated in FIG. 4(a), a fixed set of nine mask bits ("010010110") is written into the nine most significant bits of each storage location, and a 16-bit data value (having integer format) is written into the sixteen least significant bits of the remaining twenty-three bits of each storage location.

The most significant of the nine mask bits is a "0" bit (which represents a positive sign). The resulting concatenated 32-bits thus define a valid IEEE format 32-bit floating point constant, which equals the 16-bit data value (having integer format) plus the value $2^{23}$. From this, processor 16b can subtract (in one clock cycle) a floating point constant equal to $2^{23}$, resulting in a properly normalized floating point value equal to the original 16-bit integer from the FIFO daughter board.

Figure 4B:
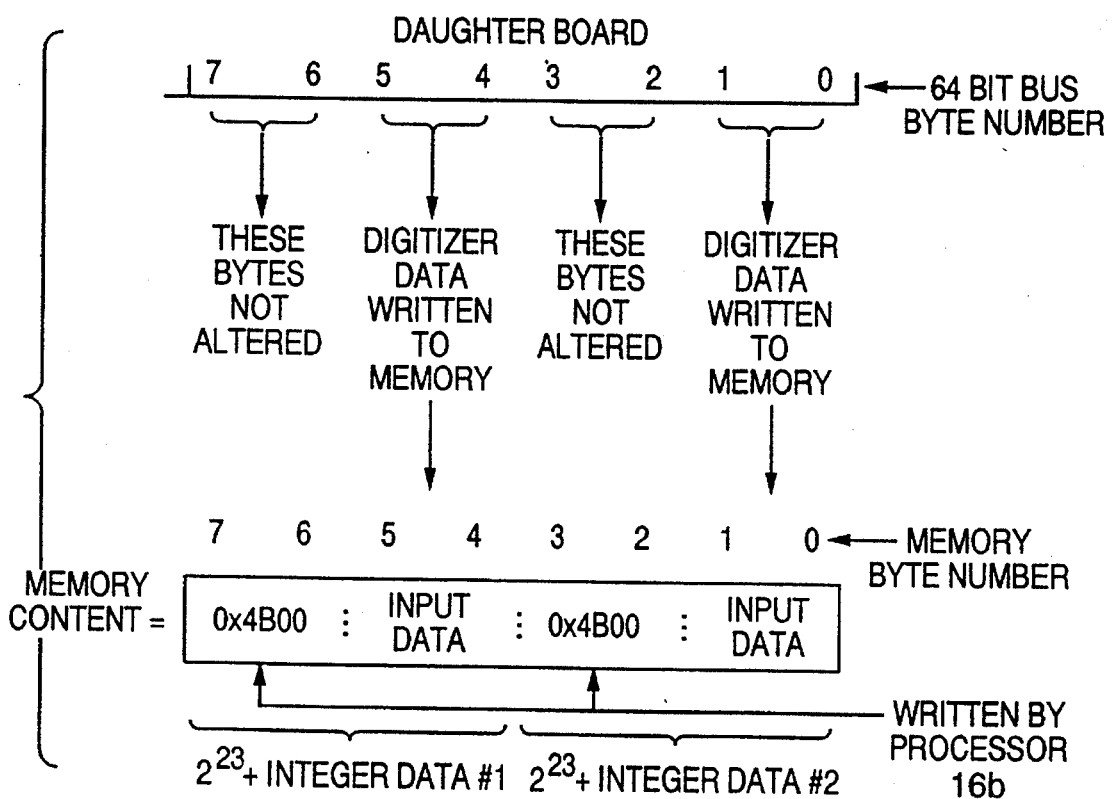
FIG. 4(b) is a diagram representing the simultaneous transfer of two 16-bit data words from a FIFO daughter circuit of FIG. 1 to one of the real time computers of FIG. 1, in a manner efficiently converting the two 16-bit words into two 32-bit floating-point format words.

FIFO daughter board 12 supports this operation by writing integer values to memory 16a in such a manner that no extra processing (by processor 16b) is required to add the mask value to each integer value. As indicated in FIG. 4(b), during each cycle of a DMA transfer from board 12 to memory 16a, board 12 asserts two 16-bit data values in parallel on 64-bit bus 41. One 16-bit value occupies bytes 0 and 1 (i.e., the lowest sixteen bits) of bus 41, and the other simultaneously transmitted 16-bit data value occupies bytes 4 and 5 of bus 41. The other four bytes of bus 41 (bytes 2, 3, 6, and 7) are not active, in the sense that the memory locations mapped to them within memory 16a (the memory locations labeled 2, 3, 6, and 7 in FIG. 4(b)) are not altered during the DMA transfer. The latter memory locations (first location 2, 3 in FIG. 4(b) and second location 6, 7 in FIG. 4(b)) contain mask bits of the type described with reference to FIG. 4(a), which have previously been written to them by processor 16b. Thus, after each cycle of a DMA transfer, processor 16b can read a first correctly formatted 32-bit floating-point value directly from memory location 0, 1, 2, and 3 (shown in FIG. 4(b)) of memory 16b, and a second correctly formatted 32-bit floating-point value directly from memory location 4, 5, 6, and 7 (shown in FIG. 4(b)) of memory 16b. No other processing is required before processor 16b performs the subtraction operation described in the previous paragraph (subtraction of the constant $2^{23}$ from each 32-bit floating-point value stored in memory 16a).

If processor 16b is capable of executing pipelined data input instructions and pipelined floating point subtraction instructions, the above-described method for converting each pair of 16-bit integer data values output simultaneously on bus 41 (from FIFO daughter board 12) to properly normalized, floating-point format values (equal to the original integer data values) requires only one processor clock cycle.

Next, timing and control of the operation of the FIG. 2 apparatus will be described with reference to FIGS. 3, 5, and 6.

Figure 5:
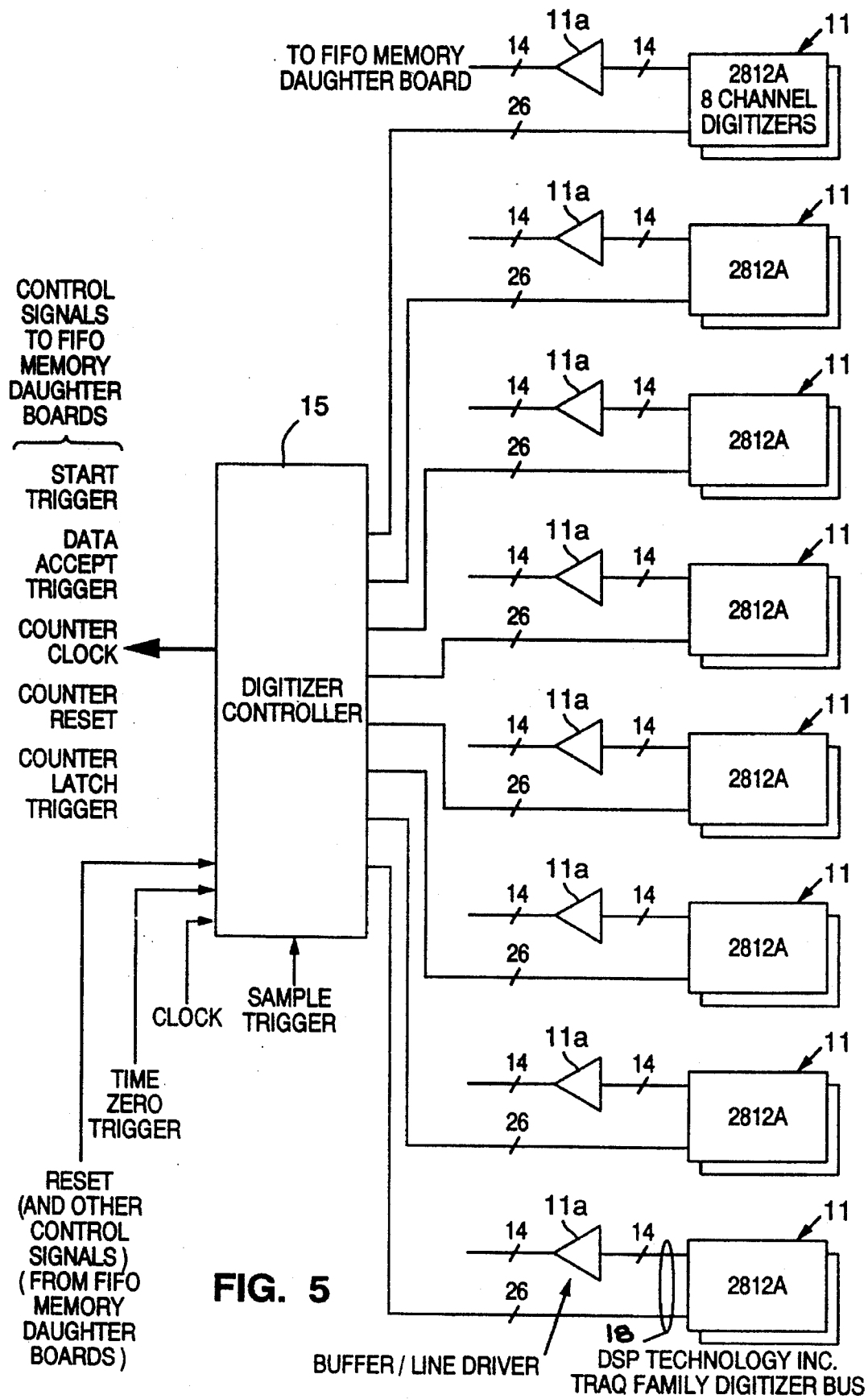
FIG. 5 is a block diagram of eight signal digitizers for supplying input data to one or more of the inventive FIFO daughter circuits, and a digitizer controller circuit for generating control signals for the digitizers and for such FIFO daughter circuits.

The control interface from the external data source to each FIFO daughter board is very simple, and utilizes only two primary trigger signals (in the embodiment of FIGS. 2 and 5, the "start trigger" and "data accept trigger" signals generated by digitizer controller 15). In the FIG. 5 embodiment, the external data source includes eight identical digitizer modules 11. Each digitizer module 11 can output sixteen channels of 14-bit digital data to the FIFO daughter boards (including FIFO daughter board 12 and 13) over one of the eight parallel 14-bit buses shown in FIG. 5, in response to address and control signals from digitizer controller 15 transferred over the 26-bit control and address portion of general purpose input bus 18. In a preferred embodiment, each digitizer 11 consists of a pair of CAMAC format, eight-channel Model 2812A digitizers commercially available from DSP Technology Inc. (or other member of the TRAQ family of digitizers commercially available from DSP Technology Inc.). In this preferred embodiment, input data bus 18 is a 40-bit general purpose digitizer bus compatible with the DSP Technology Inc. TRAQ family digitizers. However, because digitizer controller 15 is preferably a simple, non-programmable device, it has no need to use the CAMAC bus which is conventionally used with TRAQ family digitizers, except for the CAMAC bus connections for power and ground. Eight parallel 14-bit data buses (each of which can support up to 128 digitizer channels), each including buffer/line driver circuit 11a, connect digitizers 11 to the FIFO memory daughter boards. Eight 40-wire cables (as indicated in FIG. 5) connect all of digitizers 11 to digitizer controller 15. Each of these 40-wire cables carries control signals for controller 15, and also carries 14 data bits which are buffered in digitizer controller 15 and then transmitted to the FIFO daughter board over another cable.

Digitizer controller 15 generates a "data accept trigger" signal (i.e., assert a logical "1" on a data accept trigger line) in response to a control signal from at least one of digitizers 11 indicating that digitized data are available for transfer from digitizer 11 to bus 18. The top graph in FIG. 3 represents an assertion of a data accept trigger signal at time T1 and again at time T2.

In response to each leading edge of the data accept trigger signal (for example, the edges occurring at times T1 and T2 in FIG. 3), the contents of four of digitizers 11 are latched into an input register of each input multiplexer of at least one of the FIFO memory boards (for example, the contents of four digitizers are latched into four input registers of multiplexer 30 and the contents of four other digitizers are latched into four input registers of multiplexer 32 of FIFO memory board 12). Then, the digitizers are updated while data are transferred from each multiplexer to the FIFO memory connected thereto.

Figure 3:
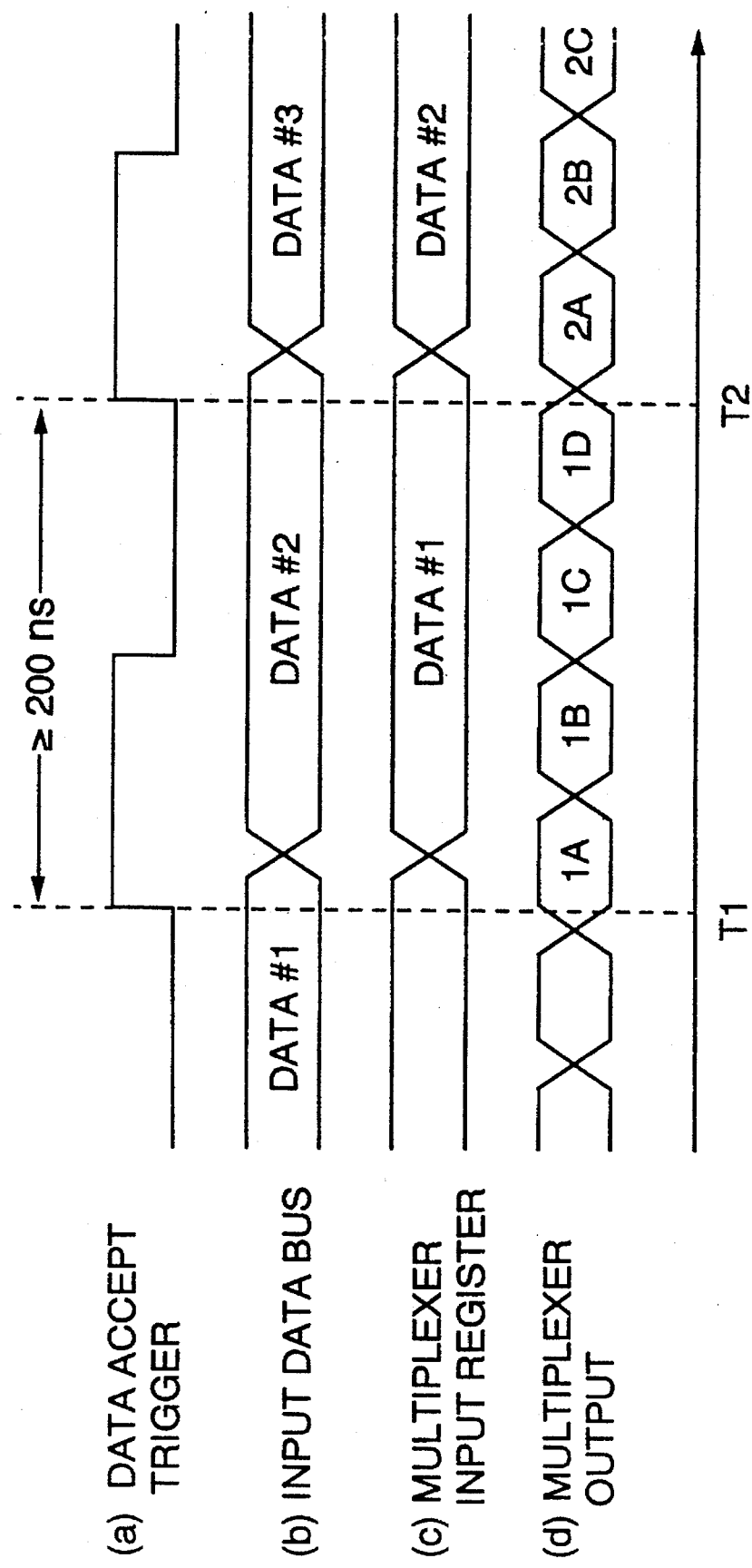
FIG. 3 is a timing diagram representing several signals processed by the FIG. 2 apparatus.

For example, as indicated in the third graph from the top in FIG. 3, a first data value (data #1) is latched into a multiplexer input register in response to the edge occurring at T1, and a second data value (data #2) is latched into the same multiplexer input register in response to the edge occurring at T2. During the period between times T1 and T2 (having duration not less than 200 nsec, corresponding to a data transfer rate to each multiplexer not more than 5 MHz), the second data value (data #2) is accumulated in a digitizer 11, and thereby becoming available for transfer over input data bus 18 to the multiplexer input register (as indicated in the second graph from the top in FIG. 3). Also during the period between T1 and T2, four data values 1A, 1B, 1C, and 1D (which had been latched into the multiplexer at time T1) are output from the multiplexer, as indicated in the bottom graph of FIG. 3. During the period following T2, data value 2A (which is the first data value of "data #2") and data values 2B, 2C, and 2D (which had been latched into the multiplexer at time T2) are output from the multiplexer as indicated in the bottom graph of FIG. 3.

A preferred embodiment of digitizer controller 15 will be described with reference to FIG. 6. In this embodiment, digitizer controller 15 includes state machine logic circuitry 50, address counter 52, delay counter and non-inverting buffers 54, 58, and 60. State machine logic circuitry 50 receives an external sample trigger signal (from processor 16b or another external source).

Figure 6:
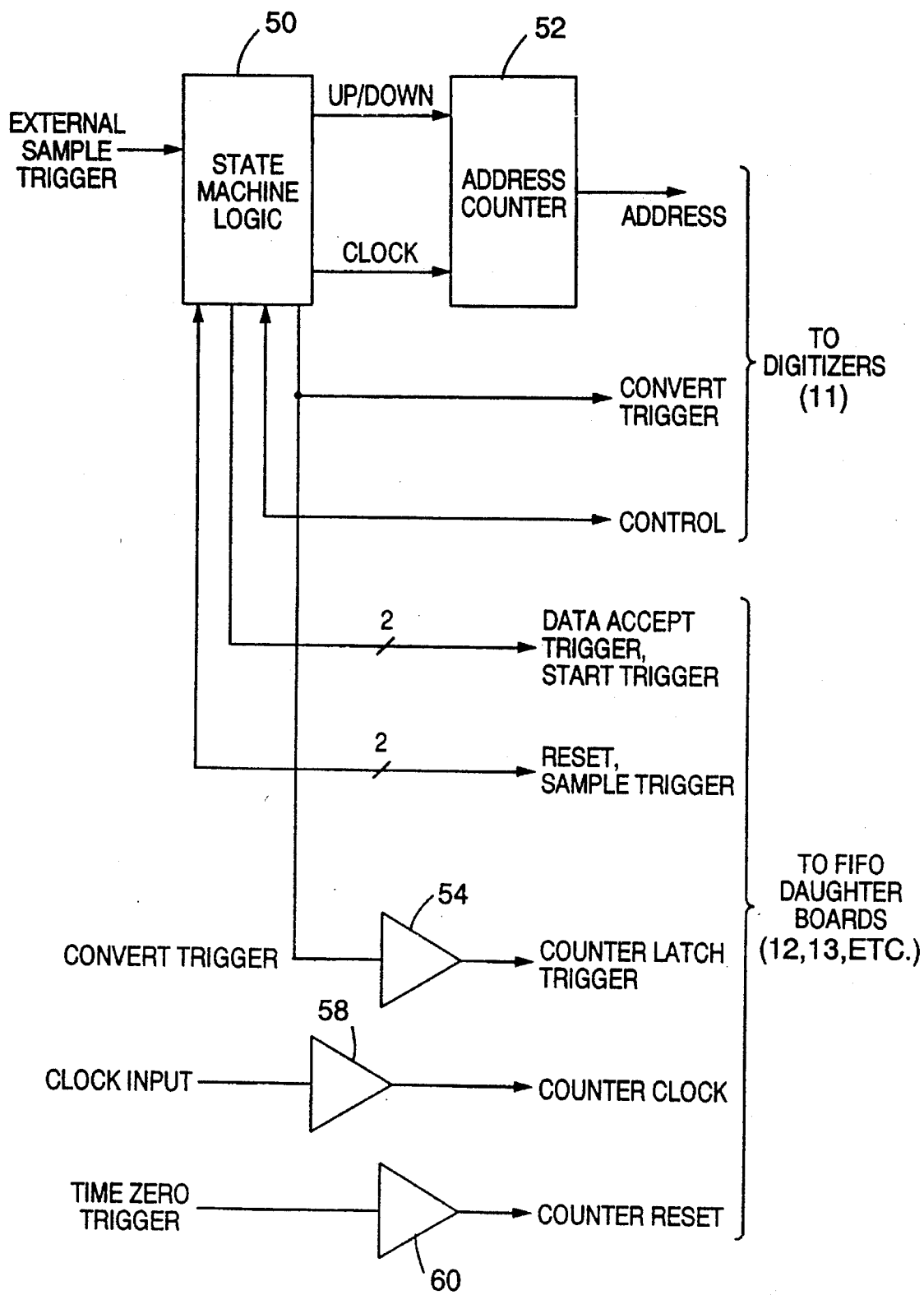
FIG. 6 is a block diagram of a preferred embodiment of the digitizer controller circuit of FIG. 5.

In response to an external sample trigger signal, the digitizer controller of FIG. 6 performs the following sequence of steps:

1. state machine logic 50 asserts a "convert trigger" signal (via bus 18) to digitizers 11 to initiate another analog-to-digital conversion on all digitizer channels (followed by a 5 to 10 microsecond delay to allow analog-to-digital conversion, depending on the type digitizer circuit used);

2. state machine logic 50 asserts the above-described start trigger signal to the direct memory access control logic 44 of each FIFO daughter board, to indicate that data will be coming and that a transfer to memory 16a should begin;

3. state machine logic 50 asserts channel addresses (via bus 18) to the digitizers 11 to cause data from the digitizer channels to be placed on bus 18 in sequence;

4. each time new data are placed on bus 18 (and are thus available for transfer), state machine logic 50 asserts the above-described data accept trigger signal to multiplexer 30 of each FIFO daughter board; and 5. after all the digitizer channels have been addressed, state machine logic 50 negates the start trigger signal to indicate to each FIFO daughter board that all of the available data have been provided and that the current DMA transfer should end after the FIFO memories have been emptied.

Non-inverting buffer 58 receives a clock signal, and asserts this signal as the "counter clock" signal (indicated in FIG. 2) to counter 38 of each FIFO daughter board. Non-inverting buffer 60 receives a time zero trigger signal, and asserts this signal as the "counter reset" signal (indicated in FIG. 2) to counter 38 of each FIFO daughter board. Non-inverting buffer 54 receives the "convert trigger" signal generated by logic 50, and asserts this signal as the "counter latch trigger" signal (indicated in FIG. 2) to counter 38 of each FIFO daughter board.

Figure 8:
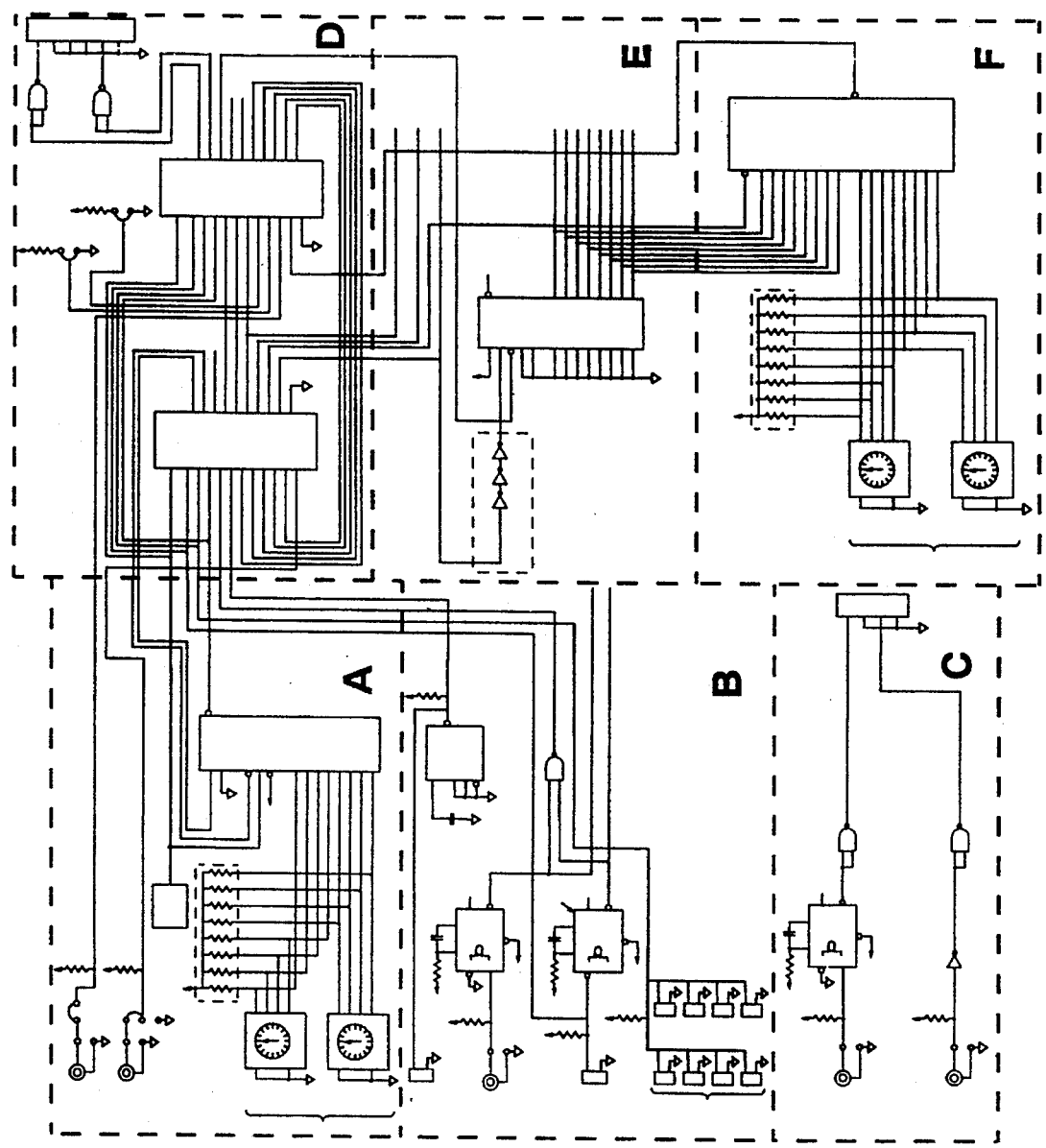
FIG. 8 Map is an overview schematic diagram of a preferred embodiment of the digitizer controller circuit of FIG. 6.
Figure 8B:
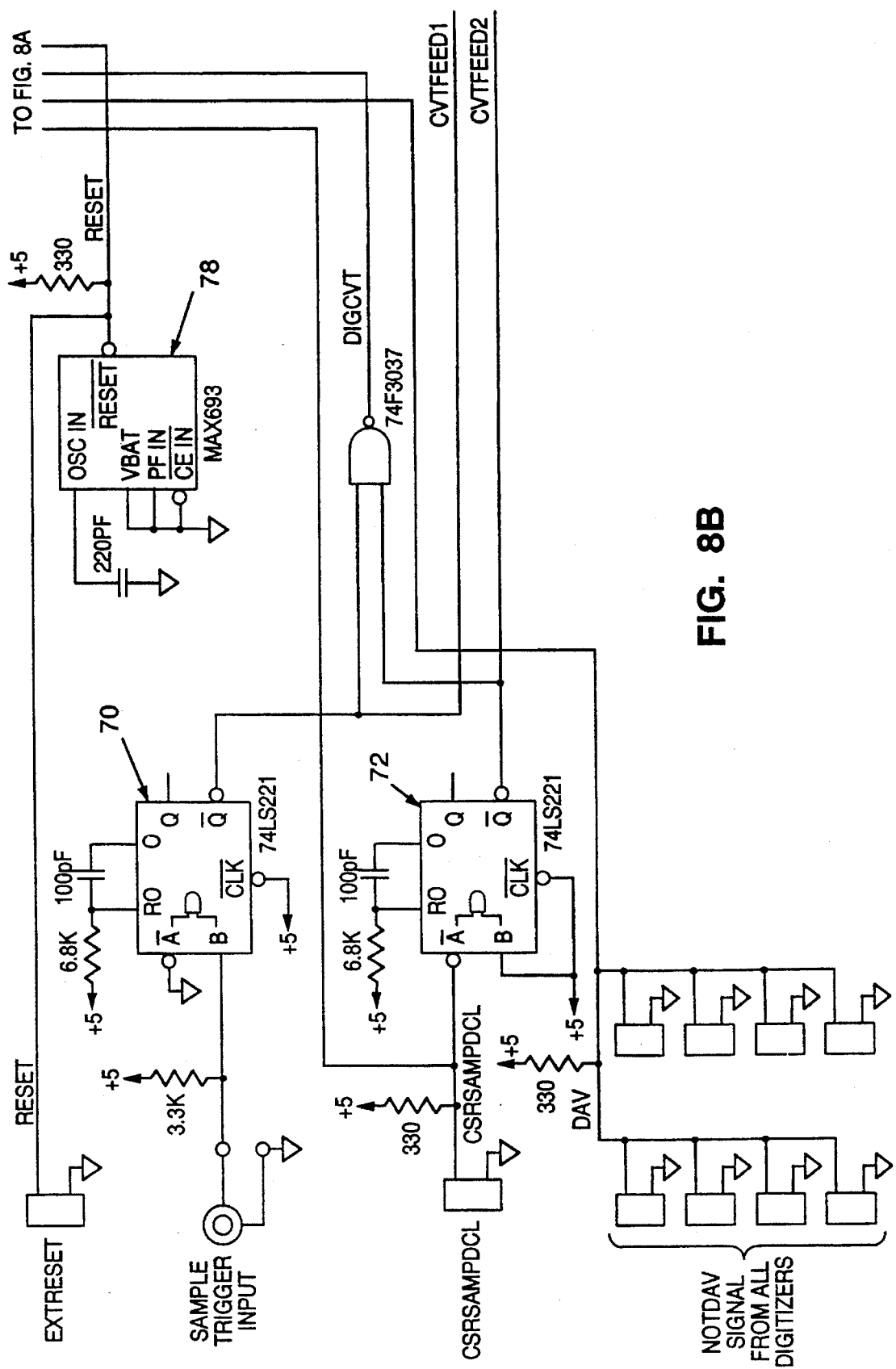
Figure 8C:
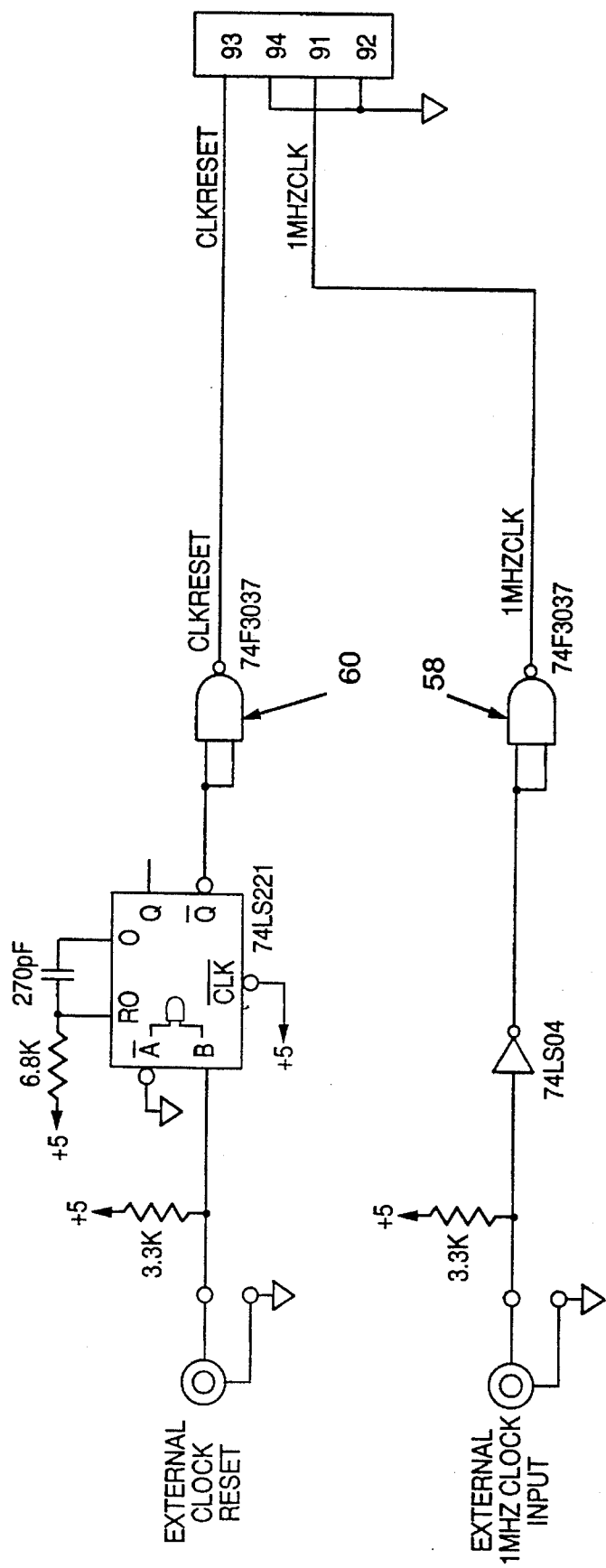
Figure 8D:
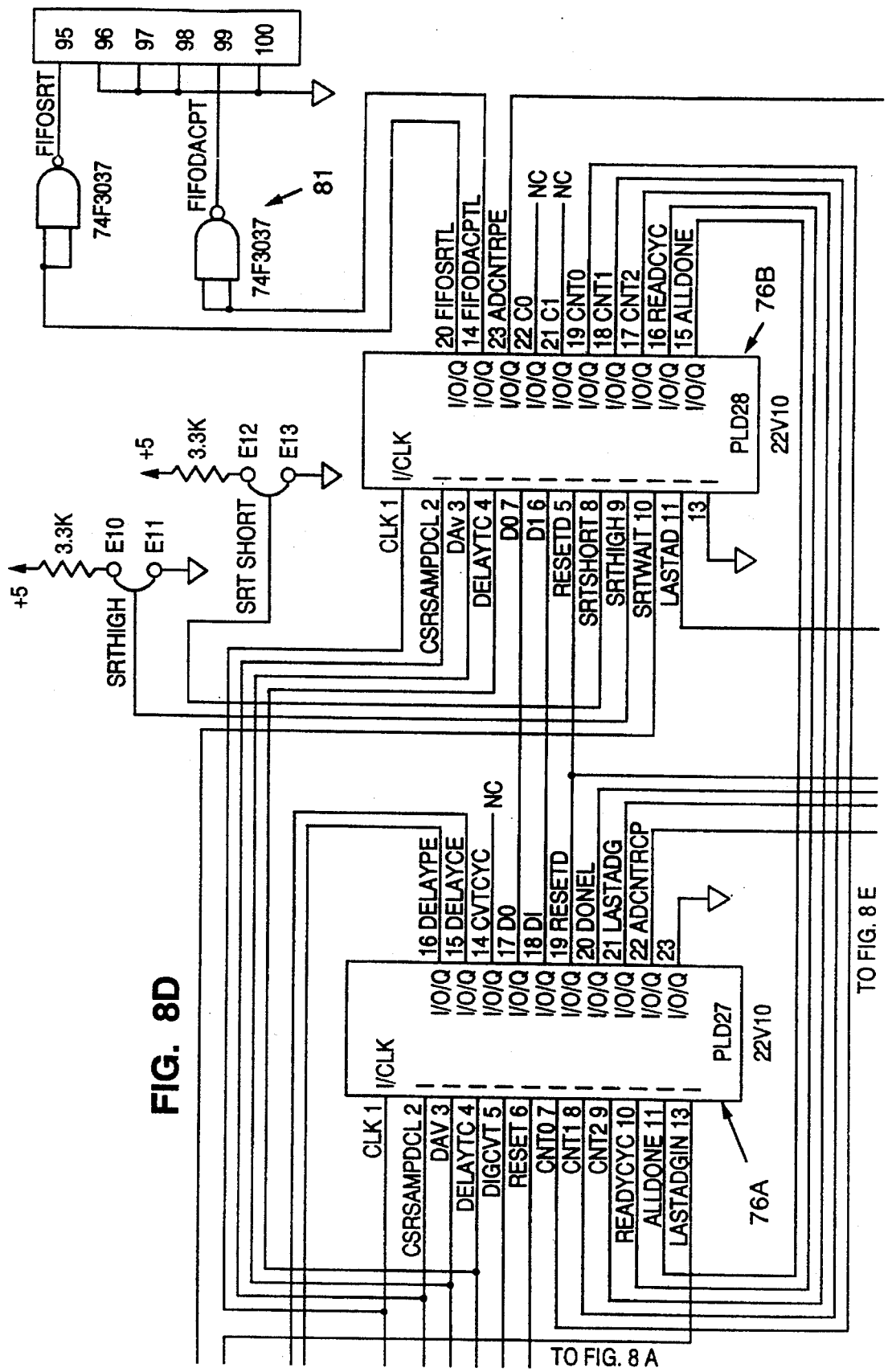
Figure 8E:
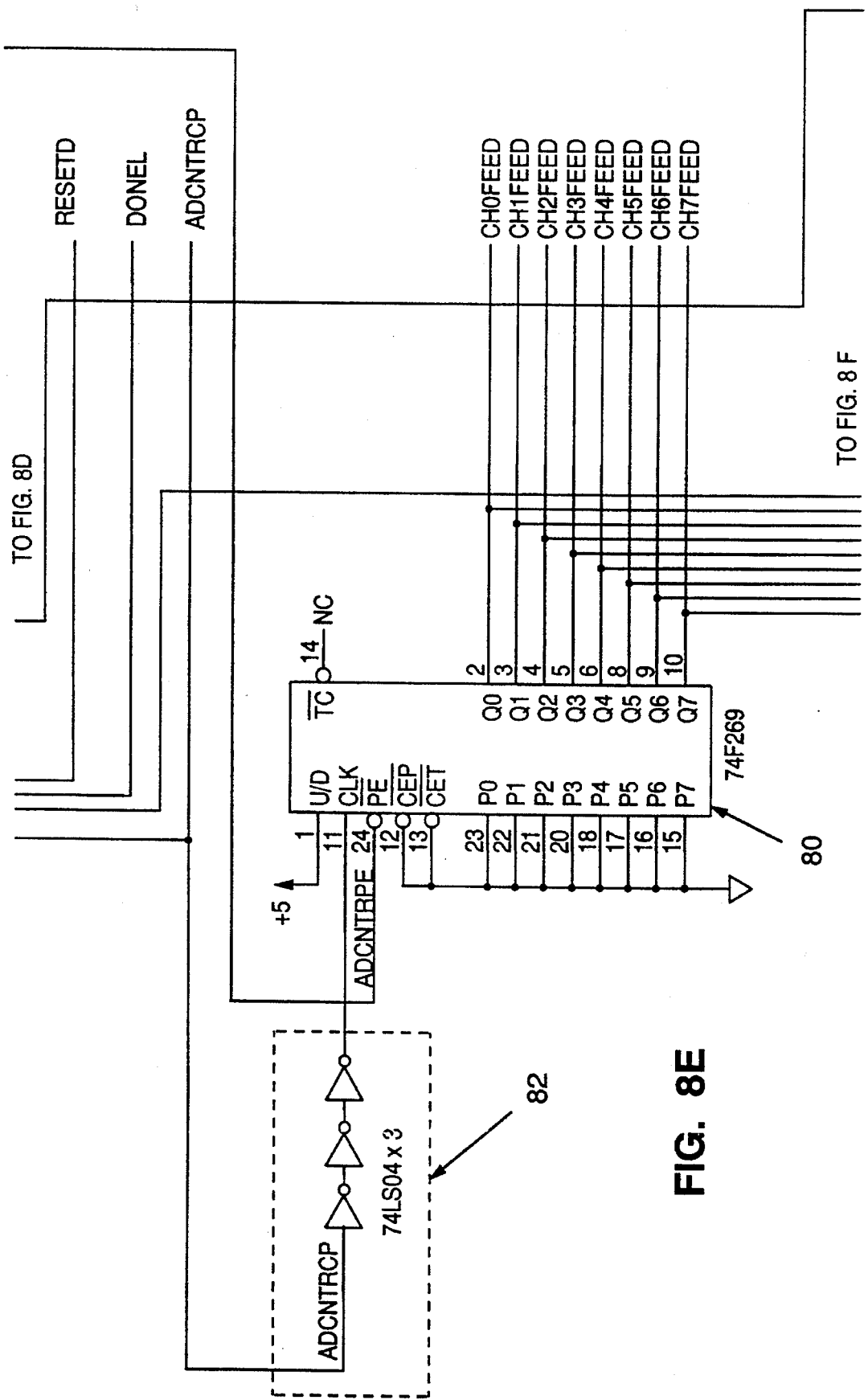
Figure 8F:
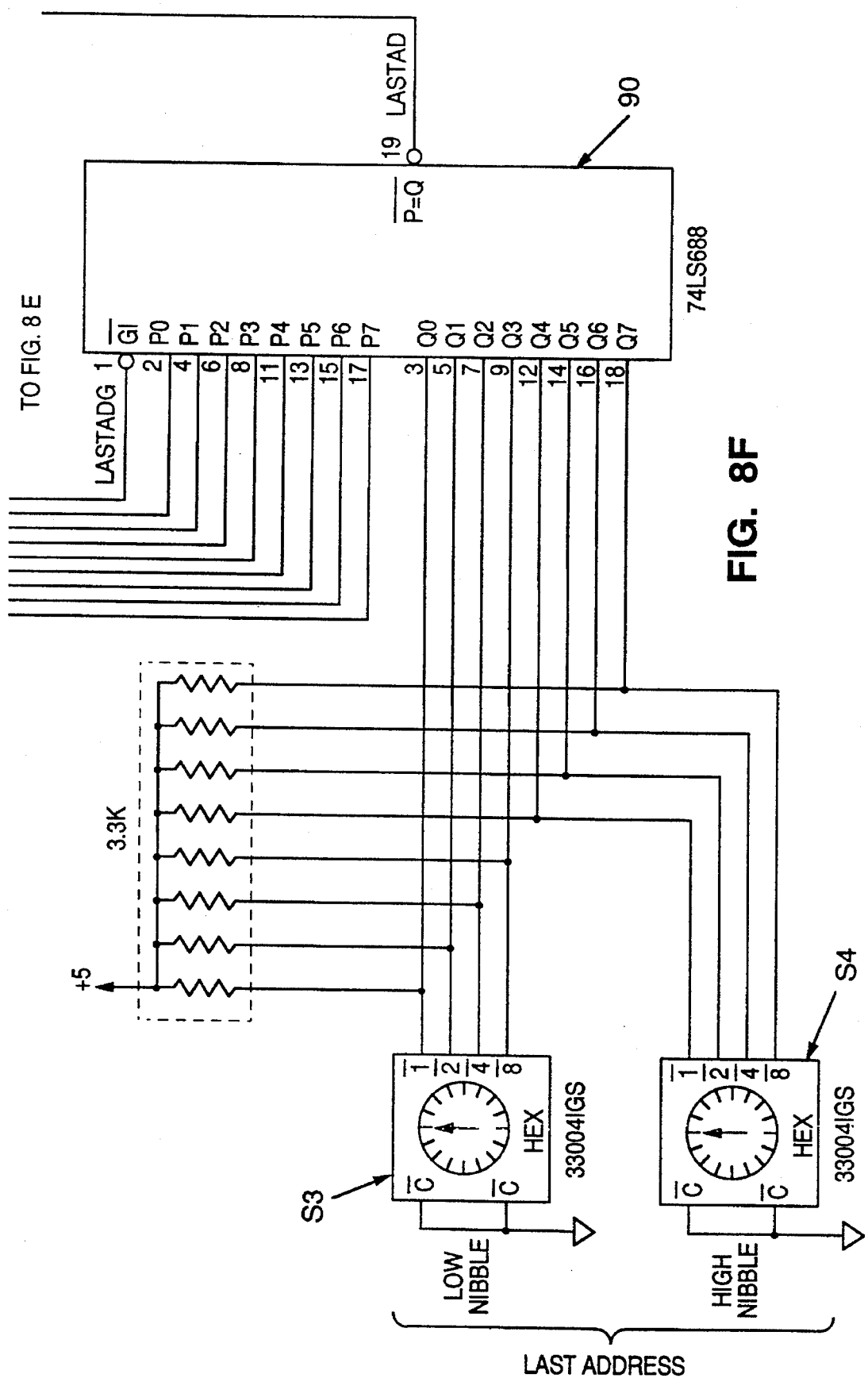

Next, details of a preferred implementation of digitizer controller 15 (which was described above in general terms with reference to FIG. 6) will be described with reference to FIG. 8. FIG. 8 MAP and respective detailed schematic drawings shown in FIG. 8A–8F. As indicated in FIG. 8 FIG. 8 MAP and FIG. 8B, there are two sources of the external sample trigger: a rising edge TTL level signal input to a front panel coaxial lemo (signal EXTSAMP) received by one-shot circuit 70; and falling edge TTL level signal from the FIFO daughter board (signal CSRSAMPDCL) received by one-shot circuit 72. The CSRSAMPDCL signal also serves as an enable signal for programmable logic device 76 (it must be low for the EXTSAMP pulse to start a controller cycle). Each external sample trigger (EXTSAMP or CSRSAMP-DCL) fires a one-shot (70 or 72, each of which can be one half of a conventional 74LS221 integrated circuit). The function of one-shots 70 and 72 is to ensure that each asserts a trigger input to programmable logic device 76 that is low before the end of the complete controller cycle.

When one of the trigger inputs (from one-shot 70 or 72) to programmable logic device 76 becomes active and the enable is active, the FIG. 8 controller initiates a data acquisition cycle. A convert trigger (a 200 ns pulse) is generated on the CVT line to trigger a digitizer convert cycle.

By setting switches S1 and S2, delay counter 80A (a conventional 74F779 integrated circuit) is preset between data acquisition cycles to the value necessary for the delay while digitizers 11 undergo their conversion operation. At the start of a data acquisition cycle, counter 80A begins counting down. When the value of counter 80A's output reaches zero, the analog to digital conversion is complete and the data can be read from the digitizers.

Clock 74 supplies a 30 MHz clock signal to circuits 76A and 76B (each of circuits 76A and 76B is a conventional 22V10 integrated circuit). Circuit 76A divides this clock by six in order to provide 5 MHz clock signal ADCNTRCP to address counter 80 (a conventional 74F269 integrated circuit which counts up from zero to generate the digitizer channel addresses). The active edge of ADCNTRCP increments counter 80. Counter 80 terminates its counting cycle when the ADCNTRPE signal from circuit 76B becomes active. Signal ADCNTRPE can become active in two cases: when comparator circuit 90 asserts signal LASTAD to circuit 76B to indicate that the output of address counter 80 matches a preset value determined by setting switches S3 and S4; or when circuit 76A detects the DAV line to be high which indicates that the previous address latched by the digitizer is invalid so that there are no valid data on the data bus).

Data are latched by the FIFO daughter board on the active edge of FIFODACPTL (a FIFO data accept signal). Signal FIFODACPTL, which is asserted by circuit 76B, is buffered in line driver 81 to generate signal FIFODACPT. Line driver 81 is required because the FIFODACPT signal line terminates with a resistance of 75 ohms at the FIFO memory daughter board.

Three inverters 82 are used to buffer the clock signal ADCNTRCP for counter 80 to provide a delay so that counter 80's output value does not change before the value is latched by the digitizers.

After the address zero is latched by the digitizer, there is a 200 ns delay before valid data appear on the digitizer data bus. At the next rising edge of FIFODACPTL, the counter value "one" is latched by the digitizers, the counter value changes from "one" to "two" and circuit 76B generates a rising edge on line FIFODACPTL to signal the FIFO memory daughter board to latch the data on the data bus (which corresponds to digitizer address zero).

This sequence continues with every rising edge of FIFODACPTL until, at a rising edge of FIFODACPTL, circuit 76A detects the DAV line to be high which indicates that the previous address latched by the digitizer is invalid so that there are no valid data on the data bus. At this point, circuit 76B generates no further FIFODACPTL pulse, circuit 76B negates the FIFOSRTL signal to end the digitizer controller cycle, and circuit 76A generates the DONEL signal to indicate to the digitizers that all data have been acquired.

Non-inverting buffer 58 receives a 1 MHz clock signal (i.e., from the front panel of the apparatus) and asserts in response the counter clock signal "1MHZCLK" to counter 38 of each FIFO daughter board. Non-inverting buffer 60 similarly buffers an external clock reset signal, and asserts in response the counter reset signal "CLKRESET" to counter 38 of each FIFO daughter board.

At power-up, conventional MAX693 integrated circuit 78 generates a pulse on the RESET line, which sets circuit 76A to its proper initial state and also resets the digitizers. The RESET line also transmits a pulse to circuit 76A if the EXTRESET line is driven active by the FIFO memory daughter boards. When active, the RESET line prevents a data acquisition cycle from starting even if a trigger pulse is received.

FIG. 7 is a diagram illustrating the sequence in which digital data values from digitizers 11 of FIG. 5 are written to real time computer memory 16a of FIG. 2. The digital data values are written to memory 16a at the location given by address counter 42 with one data value in each set of four 8-bit memory locations. The four digitizers 11 in the top half of FIG. 5 are identified as the "group 1 digitizers"(at the top of FIG. 7), and the four digitizers 11 in the bottom half of FIG. 5 are identified as the "group 2 digitizers"(at the top of FIG. 7). The group 1 digitizers consist of four pairs of digitizers (identified as 1A, 1B, 1C, and 1D at the bottom of FIG. 7), the group 2 digitizers include four pairs of digitizers (identified as 2A, 2B, 2C, and 2D at the bottom of FIG. 7), and each digitizer is preferably an eight-channel Model 2812A digitizer commercially available from DSP Technology Inc. Each of the eight digitizer pairs thus outputs sixteen channels of data (each channel identified by a different one of the circled integers in the columns of FIG. 7).

The digitizer data values are thus identified by three parameters (group number/set number/channel number), and are preferably written into memory 16a in the following sequence: 1/A/1, 2/A/1, 1/B/1, 2/B/1, . . . ,1/A/2, 2/A/2, 1/B/2, 2/B/2, . . . , 1/D/16, and finally 2/D/16. In other words, the group number varies most rapidly, followed by set number, followed by channel number.

Specific bit fields can be set within register 46 or 47 to indicate that some digitizer channels should not be written to the multiplexers (e.g., multiplexers 30 and 32). In the case that such bits are set, the data not written to the multiplexers are missing from memory 16a, and the sequence of data values set forth in the previous paragraph is compressed accordingly (i.e., to fill all available memory locations in memory 16a). This is desirable to ensure that missing or unused digitizer channels do not produce a gap in memory 16a, which in turn facilitates matrix multiplications of the type often employed in data processing.

To set up the FIG. 2 apparatus for data acquisition, the following sequence of steps is typically performed:

1. initially, the apparatus is reset to ensure that the FIFO memories are empty, and that all circuitry is free of any anomalous condition (preferably the apparatus is reset by commanding register 46 or 47 to assert a reset bit);
2. the desired initial address of memory 16a (to which data is to be written) is written to address counter 42;
3. data acquisition is enabled by setting appropriate control bits to select desired modes (such as those described above) for starting and stopping DMA transfers of data from FIFO memories 34 and 36 to memory 16a;
4. control bits are set (within register 46 or 47) to indicate which of the digitizer buses should initially be written to FIFO memories 34 and 36, and to indicate the sequence in which the digitizer buses should be written to FIFO memories 34 and 36;

5. operation of digitizers 11 is initiated, to cause the digitizers to assert the DAV signal when data become available for transfer from them;
6. after step 5, the apparatus waits for new data to become available for transfer from the digitizers to multiplexer 30 or 32; and
7. after reading data from the digitizers, the apparatus loops back for the next data acquisition cycle.

Various modifications and alterations in the structure and method of operation of the inventive apparatus will be apparent to those skilled in the art without departing from the scope and spirit of this invention. Although the invention has been described in connection with a specific preferred embodiment, it should be understood that the invention as claimed should not be unduly limited to such specific embodiment.

What is claimed is:

1. An apparatus for high speed transfer of X-bit words of digital data to storage locations of a memory in such a manner that a Y-bit word can be read from each of the storage locations, where X and Y are integers and Y is greater than X, including:

multiplexing means for receiving multiple channels of digital data at a low data rate and asserting at least one multiplexed data stream at a high data rate, wherein the digital data are said X-bit words, wherein the memory has a Y-bit storage location for each of a set of the X-bit words, and wherein mask bits are prestored in each said Y-bit storage location; and FIFO memory means for receiving the at least one multiplexed data stream from the multiplexing means and writing data comprising the at least one multiplexed data stream to the memory at said high data rate;

a bus connected to the FIFO memory means for transferring Z-bit parallel data from the FIFO memory means to the memory, where Z is an integer equal to not less than 2X; and a means for controlling the FIFO memory means to assert pairs of the X-bit words in parallel to the bus, to write each of the X-bit words into a different Y-bit storage location of the memory in concatenation with the mask bits prestored therein, whereby each of the X-bit words concatenated with the mask bits in each said Y-bit storage location determines a valid Y-bit word.

2. The apparatus of claim 1, wherein the multiplexing means includes two multiplexers and the FIFO memory means includes two FIFO memories, wherein each of the FIFO memories has an input connected to an output of one of the multiplexers, wherein each of the FIFO memories has an output connected to the bus, and wherein the FIFO memories assert data in parallel to the bus.

3. The apparatus of claim 2, wherein each of the multiplexers receives N channels of multiple-bit digital data at a first rate per channel, and outputs a data stream to one of the FIFO memories at a second rate substantially equal to N multiplied by the first rate.

4. The apparatus of claim 3, wherein the first rate is substantially equal to 5 MHz.

5. The apparatus of claim 4, wherein the bus is a 64-bit bus, and wherein the FIFO memories assert two parallel streams of 14-bit data to the 64-bit bus at a combined data rate of 40 MHz.

6. The apparatus of claim 2, wherein the FIFO memories assert two parallel streams of 14-bit data to the bus.

7. The apparatus of claim 1, wherein each of the X-bit words concatenated with the mask bits in one of the Y-bit storage locations of the memory defines a valid Y-bit floating-point format word.

8. The apparatus of claim 7, wherein X equals 14, Y equals 32, and Z equals 64.

9. The apparatus of claim 1, also including:

a real time processor connected to the memory for prestoring an identical set of the mask bits in each said Y-bit storage location of the memory.

10. An apparatus for high speed transfer of digital data to a memory, including:

multiplexing means for receiving multiple channels of digital data at a low data rate and asserting at least one multiplexed data stream at a high data rate;

FIFO memory means for receiving the at least one multiplexed data stream from the multiplexing means and writing data comprising the at least one multiplexed data stream to the memory at said high data rate; and programmable control means connected to the FIFO memory means for causing the FIFO memory means to execute a selected combination of direct memory transfer modes for direct transfer of data from the FIFO memory means to said memory, wherein at least two of the modes are modes for starting data transfers from the FIFO memory means to the memory, and at least two others of the modes are modes for stopping data transfers from the FIFO memory means to the memory, and wherein the programmable control means is programmed to cause the FIFO memory means to implement any transfer start mode selected from a set consisting of a first start mode in which a data transfer to the memory starts in response to assertion of a first value of a control signal from the digitizer controller to the programmable control means, a second start mode in which a data transfer to the memory starts automatically when the FIFO memory means contains a selected quantity of data, and a third start mode in which a data transfer to the memory starts in response to an externally generated request signal;

a digitizer means connected to the multiplexing means for supplying the multiple channels of digital data to the multiplexing means; and a digitizer controller connected to the digitizer means, the programmable control means, and the multiplexing means, for controlling transfer of said multiple channels of digital data to the multiplexing means.

11. The apparatus of claim 10, wherein the programmable control means is programmed to cause the FIFO memory means to implement any transfer stop mode selected from a set consisting of a first stop mode in which a data transfer to the memory stops in response to reception at the programmable control means of a second value of the control signal from the digitizer controller upon the emptying of the FIFO memory means, a second stop mode in which a data transfer to the memory stops automatically when a specified number of data values have been transferred from the FIFO memory means to the memory, and a third stop mode in which a data transfer to the memory stops automatically when the FIFO memory means is empty.

12. The apparatus of claim 10, also including:

a second multiplexing means for receiving additional channels of digital data at the low data rate and asserting at least one multiplexed data stream at the high data rate, wherein the second multiplexing means is connected in parallel with the multiplexing means for receiving the additional channels of digital data in parallel with the multiple channels of digital data;

a second FIFO memory means for receiving data at said high data rate from the second multiplexing means and asserting the data to a second memory; and a second programmable control means connected to the second FIFO memory means, wherein the digitizer means is connected to the second multiplexing means for supplying the additional channels of digital data to the second multiplexing means, and wherein the digitizer controller is also connected to the second programmable control means and the second multiplexing means and controls transfer of the additional channels of digital data to the second multiplexing means.

13. A method for high speed transfer of X-bit words of digital data to storage locations of a memory in such a manner that a Y-bit word can be read from each of the storage locations, where X and Y are integers and Y is greater than X, said method including the steps of:

(a) receiving multiple channels of digital data at a low data rate and asserting at least one multiplexed data stream at a high data rate, wherein the digital data are said X-bit words, wherein the memory has a Y-bit storage location for each of a set of the X-bit words;

(b) receiving the at least one multiplexed data stream at a FIFO memory means and writing the data from the FIFO memory means to the memory at the high data rate; and (c) prestoring mask bits in each said Y-bit storage location, wherein step (b) includes the steps of:

transferring Z-bit parallel data from the FIFO memory means to the memory, where Z is an integer equal to not less than 2X; and controlling the FIFO memory means to assert pairs of the X-bit words in parallel to the memory, to write each of the X-bit words into a different Y-bit storage location of the memory in concatenation with the mask bits prestored therein, whereby each of the X-bit words concatenated with the mask bits in each said Y-bit storage location determines a valid Y-bit word.

14. The method of claim 13, wherein the FIFO memory means includes a first FIFO memory which receives a first multiplexed data stream from the multiplexing means and a second FIFO memory which receives a second multiplexed data stream from the multiplexing means, and wherein step (b) includes the step of:

writing the first multiplexed data stream and the second multiplexed data stream in parallel to the memory over a bus.

15. The method of claim 14, wherein each of the first multiplexed data stream and the second multiplexed data stream is a 14-bit data stream.

16. The method of claim 15, wherein the bus is a 64-bit bus, and the first multiplexed data stream and the second multiplexed data stream are written to the memory at a combined data rate of 40 MHz.

17. The method of claim 13, wherein each of the X-bit words concatenated the mask bits in one of the Y-bit storage locations of the memory defines a valid Y-bit floating-point format word.

18. The method of claim 13, wherein X equals 14, Y equals 32, and Z equals 64.

19. A method for high speed transfer of digital data to a memory, including the steps of:

(a) receiving multiple channels of digital data at a low data rate and asserting at least one multiplexed data stream at a high data rate; and (b) receiving the at least one multiplexed data stream at a FIFO memory means and writing the data from the FIFO memory means to the memory at the high data rate, wherein a programmable control means is connected to the FIFO memory means, a digitizer controller is connected to the multiplexing means for controlling transfer of said multiple channels of digital data to the multiplexing means, and a programmable control means is connected to the FIFO memory means, and also including the steps of:

programming the control means to cause the FIFO memory means to execute a selected combination of modes, wherein at least two of the modes are modes for starting data transfers from the FIFO memory means to the memory, and at least two others of the modes are modes for stopping data transfers from the FIFO memory means to the memory;

starting a transfer of data from the FIFO memory means to the memory in response to assertion of a first value of a control signal from the digitizer controller to the programmable control means;

starting a transfer of data from the FIFO memory means to the memory automatically when the FIFO memory means contains a selected quantity of data; and starting a transfer of data from the FIFO memory means to the memory in response to an externally generated request signal.

20. The method of claim 19, wherein a digitizer controller is connected to the multiplexing means for controlling transfer of said multiple channels of digital data to the multiplexing means, and a programmable control means is connected to the FIFO memory means, and wherein step (b) includes the step of:

stopping a transfer of data from the FIFO memory means to the memory in response to reception at the programmable control means of a second value of the control signal from the digitizer controller upon the emptying of the FIFO memory means.

21. The method of claim 19, wherein step (b) includes the step of:

stopping a transfer of data from the FIFO memory means to the memory automatically when a specified number of data values have been transferred from the FIFO memory means to the memory.

22. The method of claim 19, wherein step (b) includes the step of:

stopping a transfer of data from the FIFO memory means to the memory automatically when the FIFO memory means is empty.

* * * * *